(12) United States Patent
Schneider et al.

(10) Patent No.: US 11,223,591 B2
(45) Date of Patent: Jan. 11, 2022

(54) DYNAMICALLY MODIFYING SHARED LOCATION INFORMATION

(71) Applicant: International Business Machines Corporation, Armonk, NY (US)

(72) Inventors: Scott E. Schneider, Rolesville, NC (US); Christopher J. Hardee, Raleigh, NC (US); Shikhar Kwatra, Durham, NC (US); Steven Joroff, River Vale, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/782,095

(22) Filed: Feb. 5, 2020

(65) Prior Publication Data
US 2021/0243149 A1    Aug. 5, 2021

(51) Int. Cl.
*H04L 12/58* (2006.01)
*G06Q 50/00* (2012.01)
*H04W 4/02* (2018.01)

(52) U.S. Cl.
CPC ............. *H04L 51/20* (2013.01); *G06Q 50/01* (2013.01); *H04L 51/32* (2013.01); *H04W 4/023* (2013.01)

(58) Field of Classification Search
CPC ...................................................... H04L 51/20
USPC ........................................................ 709/206
See application file for complete search history.

(56) References Cited

U.S. PATENT DOCUMENTS

| | | |
|---|---|---|
| 6,813,499 B2 | 11/2004 | McDonnell et al. |
| 7,224,987 B1 | 5/2007 | Bhela et al. |
| 7,999,728 B2 | 8/2011 | Chen et al. |
| 8,611,929 B1 * | 12/2013 | Vandehey ............... G06Q 10/10 455/456.3 |
| 8,655,792 B1 * | 2/2014 | Gauvin ............... G06F 16/9535 705/319 |
| 9,369,422 B1 * | 6/2016 | Ozog ....................... H04L 51/32 |
| 9,442,903 B2 * | 9/2016 | Katic ...................... G06Q 50/01 |
| 9,503,509 B1 * | 11/2016 | Hunt .................. H04N 21/2396 |
| 9,560,479 B2 | 1/2017 | Altman et al. |

(Continued)

FOREIGN PATENT DOCUMENTS

| | | | |
|---|---|---|---|
| CN | 103745014 A | | 4/2014 |
| CN | 104508653 A | * | 4/2015 |

(Continued)

OTHER PUBLICATIONS

Merriam-Webster, "program", 2020 (Year: 2020).*

(Continued)

*Primary Examiner* — Ondrej C Vostal
(74) *Attorney, Agent, or Firm* — Stosch S. Sabo

(57) ABSTRACT

Described are techniques for modifying a shareable location in shared posts. The techniques including a method comprising inputting a social networking post received from a user device to a location precision model executing as an application on the user device, and where the social networking post is associated with a first time and a shareable location. The method further comprises outputting, by the location precision model, a modified shareable location. The method further comprises transmitting the social networking post to a social networking system with a modified shareable location, wherein the modified shareable location is a generalized version of the shareable location.

25 Claims, 12 Drawing Sheets

(56) References Cited

U.S. PATENT DOCUMENTS

| | | | |
|---|---|---|---|
| 9,904,797 B2 | 2/2018 | Oliver et al. | |
| 10,133,710 B2* | 11/2018 | Katic | G06F 16/957 |
| 10,148,762 B2* | 12/2018 | Rogers | H04W 4/18 |
| 10,382,538 B1* | 8/2019 | Chummun | H04W 4/21 |
| 10,440,131 B2* | 10/2019 | Memon | G08G 1/202 |
| 10,952,013 B1* | 3/2021 | Brody | H04W 4/02 |
| 2011/0106895 A1* | 5/2011 | Ventilla | H04L 12/66 709/206 |
| 2011/0231493 A1* | 9/2011 | Dyor | H04L 67/18 709/206 |
| 2011/0238762 A1* | 9/2011 | Soni | H04L 51/32 709/206 |
| 2012/0185486 A1* | 7/2012 | Voigt | H04L 51/32 707/741 |
| 2013/0055128 A1* | 2/2013 | Muti | G06Q 50/01 715/769 |
| 2013/0066963 A1* | 3/2013 | Odio | H04L 65/403 709/204 |
| 2013/0197998 A1* | 8/2013 | Buhrmann | G06Q 20/4016 705/14.53 |
| 2014/0195625 A1* | 7/2014 | Weldon | H04L 51/20 709/206 |
| 2015/0032771 A1* | 1/2015 | Berio | G06Q 50/01 707/769 |
| 2015/0046452 A1* | 2/2015 | Agrawal et al. | G06F 16/9537 707/737 |
| 2015/0058957 A1* | 2/2015 | Halliday | H04W 12/06 726/1 |
| 2015/0110389 A1* | 4/2015 | Lerios | H04N 1/603 382/162 |
| 2015/0170296 A1* | 6/2015 | Kautz | G06Q 10/00 705/319 |
| 2015/0245168 A1* | 8/2015 | Martin | G06Q 50/01 715/751 |
| 2015/0334077 A1* | 11/2015 | Feldman | H04L 51/20 715/744 |
| 2015/0350349 A1* | 12/2015 | Kao | H04L 67/18 709/204 |
| 2016/0112428 A1* | 4/2016 | Terleski | G06F 21/6245 726/4 |
| 2017/0034654 A1* | 2/2017 | Oberbeck | H04N 21/44213 |
| 2017/0126819 A1* | 5/2017 | Kao | G06Q 50/01 |
| 2017/0214646 A1* | 7/2017 | Longo | H04L 67/18 |
| 2017/0308962 A1* | 10/2017 | Raskin | G06F 16/3326 |
| 2018/0063684 A1* | 3/2018 | Cheng | H04W 4/21 |
| 2018/0097762 A1* | 4/2018 | Garcia | H04L 67/18 |
| 2018/0097763 A1* | 4/2018 | Garcia | G06Q 30/06 |
| 2018/0131654 A1* | 5/2018 | Nourbakhsh | H04L 51/32 |
| 2018/0136797 A1* | 5/2018 | Dickens | G06F 3/0482 |
| 2018/0157473 A1* | 6/2018 | Raghavan | G06F 8/61 |
| 2018/0182029 A1* | 6/2018 | Vinay | G06N 20/00 |
| 2018/0287989 A1* | 10/2018 | Hardee | H04L 67/10 |
| 2018/0300505 A1 | 10/2018 | Chakraborty et al. | |
| 2018/0367487 A1* | 12/2018 | Li | H04L 51/14 |
| 2018/0374164 A1* | 12/2018 | Ozog | G06Q 30/0269 |
| 2019/0052701 A1* | 2/2019 | Rathod | H04L 67/22 |
| 2019/0116473 A1* | 4/2019 | Constantinides | H04L 51/10 |
| 2019/0138656 A1* | 5/2019 | Yang | G06F 16/9535 |
| 2019/0190874 A1* | 6/2019 | Petrosian | G06F 16/29 |
| 2019/0279522 A1* | 9/2019 | Jafari | G09B 7/00 |
| 2020/0036802 A1* | 1/2020 | Bullock | G06F 16/29 |
| 2020/0082462 A1* | 3/2020 | Nguyen | G06F 16/29 |
| 2020/0120480 A1* | 4/2020 | Chu | H04W 8/16 |

FOREIGN PATENT DOCUMENTS

| | | | |
|---|---|---|---|
| CN | 104780501 A | * | 7/2015 |
| CN | 104780501 A | | 7/2015 |
| CN | 105262674 A | * | 1/2016 |
| CN | 105262674 A | | 1/2016 |
| WO | WO-2018111426 A1 | * | 6/2018 |
| WO | 2018200043 A1 | | 11/2018 |
| WO | 2018201104 A1 | | 11/2018 |
| WO | WO-2018201102 A1 | * | 11/2018 |

OTHER PUBLICATIONS

Macmillan dictionary, "generalized", 2021 (Year: 2021).*
Wikipedia, "Generalized linear model", 2021 (Year: 2021).*
Wikipedia, "Generalized additive model", 2021 (Year: 2021).*
Wikipedia, "Generalized additive module for location", 2021 (Year: 2021).*
Shokri et al., "Quantifying Location Privacy", 2011 (Year: 2011).*
Sun et al., "Location information disclosure in location-based social network services: Privacy calculus, benefit structure, and gender differences", 2015 (Year: 2015).*
Wikipedia, "social media", 2021 (Year: 2021).*
Wikipedia, "what is social media post?", 2021 (Year: 2021).*
Unknown, "Popular Patterns", UC Berkeley School of Information, printed Dec. 20, 2019, 1 page.
Wikipedia, "Location obfuscation", From Wikipedia, the free encyclopedia, last edited on Apr. 14, 2019, printed Dec. 20, 2019, 2 pages.
Venkatanathan et al., "Who, when, where: Obfuscation preferences in location-sharing applications", CyLab Carnegie Mellon University, Jun. 30, 2011, 12 pages.
Tsai et al., "Location-Sharing Technologies: Privacy Risks and Controls", Updated Feb. 2010, 26 pages.
Brush et al., "Exploring End User Preferences for Location Obfuscation, Location-Based Services, and the Value of Location", UbiComp 2010, Sep. 26-29, 2010, 10 pages.
Krumm, J., "A Survey of Computational Location Privacy", Microsoft Research, Sep. 29, 2007, 8 pages.
Mell et al., "The NIST Definition of Cloud Computing", Recommendations of the National Institute of Standards and Technology, Sep. 2011, 7 pages.
Notification of Transmittal of the International Search Report and the Written Opinion of the International Searching Authority, or the Declaration, International Application No. PCT/IB2021/050789, dated May 7, 2021, 9 pages.

* cited by examiner

DYNAMICALLY MODIFYING SHARED LOCATION INFORMATION

BACKGROUND

The present disclosure relates to user privacy, and, more specifically, to dynamically modifying shared location information.

Smart devices are capable of determining and sharing a user's location. For example, individuals may use a smart device to take a photo and upload the photo to a social networking site (SNS). The photo may be automatically tagged with geocoordinates associated with the user's location, or the photo may be manually labeled with the user's location based on user input (e.g., "@Chicago" added to text about a shared photo). As another example, a user may use an exercise application to track a location of the user during a run, and this location information may be shared on a social networking site. These examples illustrate that a user's precise location may be shared to the public.

Public sharing of a user's location presents privacy, security, and/or safety risks. For example, a malicious actor may exploit published information about an individual's location to follow or harm the individual. As another example, a malicious actor may exploit published information about an individual's location to steal from a user's home, vehicle, or another vacant location associated with the user. Thus, location sharing presents risk. However, location sharing itself is not inherently negative. In fact, location sharing may be useful in developing a community, documenting experiences, and the like. Accordingly, risks associated with location sharing are largest in real-time or approximately real-time location sharing.

Currently, for a user to mitigate the privacy, security, and/or safety risks associated with location sharing, a user must opt-out of features in smart devices and/or social networking platforms that enable location sharing. Opting out of location sharing features generally requires a user to pursue time-consuming modifications to user profiles across numerous social networking platforms (to say nothing of the degraded user experience associated with limiting functionality of the various social networking platforms). Even after opting out of automated location sharing functionality, a user may still be required to censor manually created posts during usage of various social networking platforms to remove any location information from the post. Another strategy a user may pursue is to avoid usage of smart devices and/or social networking platforms altogether. Thus, current solutions are inadequate at least in terms of usability, efficiency, and portability for enabling users to adequately mitigate the privacy, security, and/or safety risks associated with shared location information on social networking platforms.

SUMMARY

Aspects of the present disclosure are directed toward a computer-implemented method comprising inputting a social networking post to a location precision model configured to modify a location resolution of the social networking post, where the social networking post is associated with a first time and a shareable location. The method further comprises publishing the social networking post with a modified shareable location, where the modified shareable location is a generalized version of the shareable location. The method further comprises determining that a parameter associated with the location precision model is satisfied. The method further comprises modifying the social networking post to include an updated modified shareable location, where the updated modified shareable location is more specific than the modified shareable location and less specific than the shareable location. Further aspects of the present disclosure are directed to systems and computer program products configured to perform the aforementioned method.

Advantageously, the aforementioned method improves privacy, security, and/or safety of a user by dynamically modifying location information associated with publicly available posts without requiring the user to alter their interactions with social networking platforms.

Another aspect of the present disclosure, including the limitations of the aforementioned method, further includes where the location precision model is stored on a social networking system, and where the social networking post is received from a user device.

Advantageously, this aspect of the present disclosure enables aspects of the present disclosure to be incorporated into an existing social networking platform. Incorporating aspects of the present disclosure into a social networking platform automates improved privacy, security, and/or safety for all members of the social networking platform.

Another aspect of the present disclosure, including the limitations of the aforementioned method, further includes where the location precision model is stored on a user device, and where the social networking post is received from the user device.

Advantageously, this aspect of the present disclosure enables aspects of the present disclosure to be incorporated into a user device where it can interact with numerous social networking platforms having applications or portals loaded on the user device. Thus, this aspect of the present disclosure enables a single user to concurrently improve their privacy, safety, and/or security across numerous social networking platforms.

Another aspect of the present disclosure, including the limitations of the aforementioned method, further includes where the updated modified shareable location is based on an amount of time between the first time and a current time.

Advantageously, this aspect of the present disclosure enables the present disclosure to dynamically modify location resolution as a function of time.

Another aspect of the present disclosure, including the limitations of the aforementioned method, further includes where the modified shareable location is based on a distance between the shareable location and a current location of a user device that created the social networking post.

Advantageously, this aspect of the present disclosure enables the present disclosure to dynamically modify location resolution as a function of distance.

Further aspects of the present disclosure are directed toward a computer-implemented method comprising inputting a social networking post received from a user device to a location precision model executing as an application on the user device, and where the social networking post is associated with a first time and a shareable location. The method further comprises outputting, by the location precision model, a modified shareable location. The method further comprises transmitting the social networking post to a social networking system with a modified shareable location, where the modified shareable location is a generalized version of the shareable location. Further aspects of the present disclosure are directed to systems and computer program products configured to perform the aforementioned method.

Advantageously, the aforementioned method improves privacy, security, and/or safety of a user by dynamically modifying location information associated with publicly available posts without requiring the user to alter their interactions with social networking platforms.

Further aspects of the present disclosure are directed toward a computer-implemented method comprising inputting a geotagged post received from a user device to a location precision model, wherein the geotagged post is associated with a first time and a geolocation. The method further comprises outputting, by the location precision model, a generalized geolocation. The method further comprises publishing the geotagged post with the generalized geolocation. The method further comprises intermittently updating the geotagged post by publishing a series of updated generalized geolocations based on the location precision model and a location of the user device. Further aspects of the present disclosure are directed toward systems and computer program products configured to implement the aforementioned method.

Advantageously, the aforementioned method improves privacy, security, and/or safety of a user by dynamically modifying location information associated with publicly available posts without requiring the user to alter their interactions with social networking platforms.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
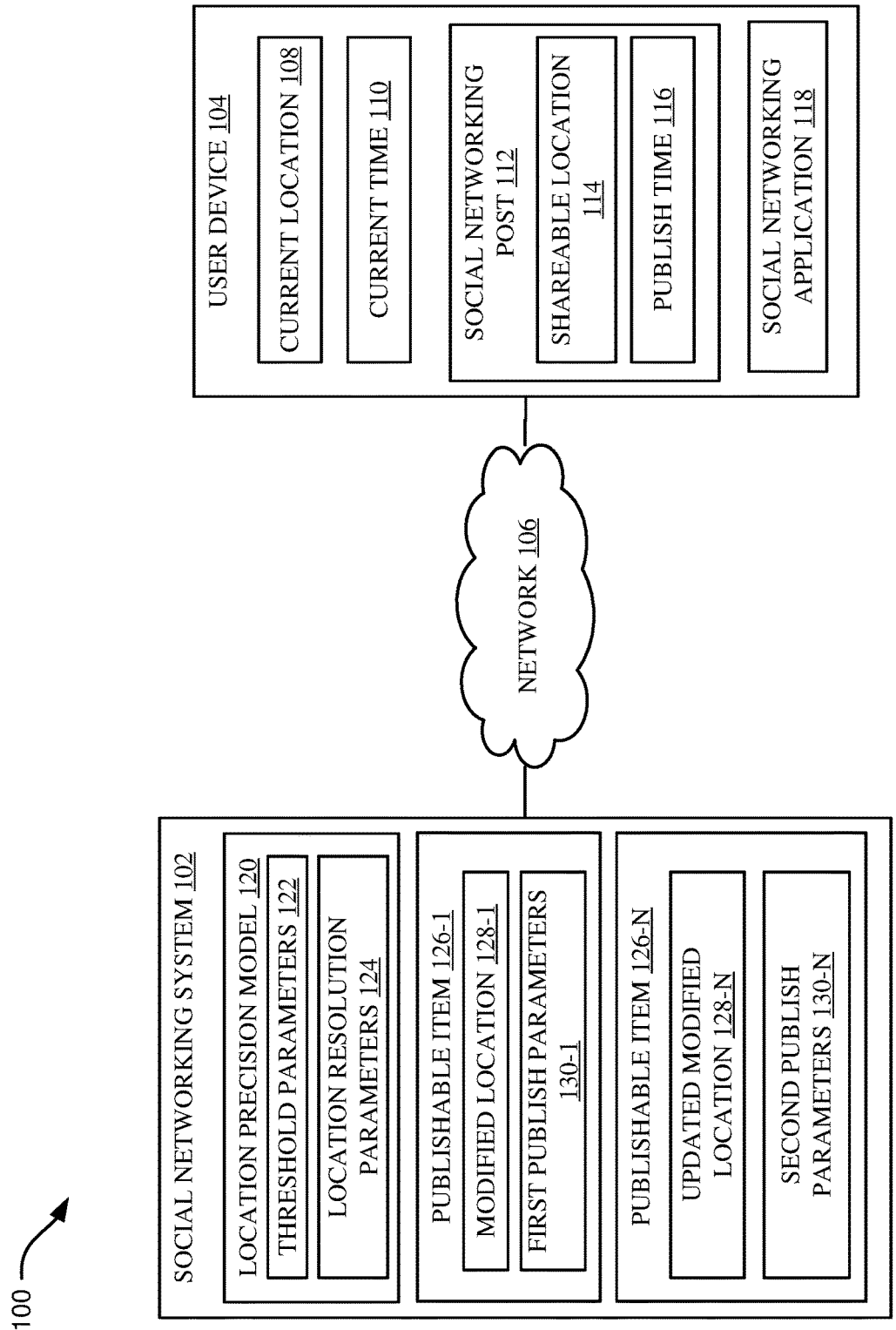
FIG. 1 illustrates a block diagram of an example social networking environment having a location precision model located on a social networking system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward user privacy, and, more specifically, to dynamically modifying shared location information. While not limited to such applications, embodiments of the present disclosure may be better understood in light of the aforementioned context.

Referring now to FIG. 1, illustrated is an example social networking environment 100, in accordance with some embodiments of the present disclosure. The social networking environment 100 includes a social networking system 102 communicatively coupled to a user device 104 via a network 106. Social networking system 102 can be any physical or virtual set of hardware configured to store, host, run, or otherwise maintain information for a social networking platform, site, application, or the like. For example, social networking system 102 can include one or more servers, one or more processors, one or more computer-readable storage media, and so on.

User device 104 can be any user device such as, but not limited to, a computer, a desktop, a laptop, a tablet, a smartphone, a smartwatch, smart glasses, a fitness tracker, a health monitor, a wearable device, or another device.

Network 106 can be any wired or wireless network capable of permanently or intermittently communicatively coupling the social networking system 102 to the user device 104. The network 106 can be, for example, a cellular network (e.g., 3G, 4G, 5G, etc.), a wireless network (e.g., the Internet, a wireless local area network (WLAN), a wireless wide area network (WWAN), a wireless metropolitan area network (WMAN), a wireless personal area network (WPAN)), a wired network (e.g., a network utilizing coaxial cables, optical fiber or glass fiber cables, Ethernet cables, etc.), another network configuration (e.g., a terrestrial microwave-based wireless network communication, a satellite-based wireless communication network, a radio-based wireless communication network, etc.), or a combination of any of the aforementioned network configurations.

User device 104 can be configured to detect and store a current location 108 and a current time 110. In some embodiments, the current location 108 can be detected from, for example, a global positioning system (GPS) associated with the user device 104. In some embodiments, the current location 108 can be a labeled, tagged, or otherwise defined location based on user input to the user device 104. As an example, a user may label an electronic photograph or a social networking post with "@Chicago" to indicate the electronic photograph or the social networking post is associated with a location of Chicago. More specific location labels (e.g., addresses, GPS coordinates, etc.) or less specific location labels (e.g., country, region, county, etc.), whether manually or automatically created, are also possible and within the spirit and scope of the present disclosure.

User device 104 can further store a current time 110. The current time 110 can be derived from an internal clock such as, for example, a Real Time Clock (RTC). The current time 110 can also be derived from GPS signals in user devices 104 that includes GPS functionality.

The user device 104 also stores a social networking post 112. The social networking post 112 can be, but is not limited to, text (e.g., a post, a blog, a caption, etc.), one or more photographs, one or more videos, one or more audio files, one or more reactions (e.g., emoticons, emojis, etc.), or a combination of two or more of the aforementioned items. The social networking post 112 can be associated with a shareable location 114 and a publish time 116. The publish time 116 can refer to a time that the social networking post 112 is created, a time that the social networking post 112 is saved, a time that the social networking post 112 is scheduled to be published, a time that the social networking post 112 is sent to the social networking system 102, or a different time. The social networking post 112 can also be referred to simply as a post, though the term post can include any number of types of shareable information which may or may not related to social networking. For example, posts can include any information (e.g., text, audio, video, image, or other data) that is created by (or on behalf of) a first user of a first electronic device and subsequently made accessible to one or more other users of one or more other electronic devices.

In some embodiments, the shareable location 114 can refer to a current location 108 at the publish time 116. In some embodiments, the shareable location 114 can refer to a tagged, labeled, or otherwise defined location based on user input to the user device 104. In yet other embodiments, the shareable location 114 can refer to a tagged, labeled, or otherwise defined location based on machine learning algorithms using the social networking post 112 and other information associated with user device 104 as input and generating the shareable location 114 as output. Some examples of shareable location 114 are GPS coordinates, an address, a name (e.g., a park name, a store name, etc.), and the like. When using GPS coordinates, the GPS coordinates can be presented in Degrees, Minutes, and Seconds (DMS) format (e.g., 43° 13'54.8"N 93°15'22.4"W), in Decimal Degrees (DD) format (e.g., 43.231878, −93.256232), or in a different GPS format.

The user device 104 can further include a social networking application 118 hosted on user device 104 and functioning as a portal to social networking system 102. A user of the user device 104 can login to a unique user profile of the social networking application 118 using login credentials such as a name (e.g., email address, sign-in name, a serial number, etc.) and a password (e.g., an alphanumeric password, a biometric password, etc.).

A user may desire to post, publish, or otherwise share the social networking post 112 by uploading the social networking post 112 to the social networking system 102 via the social networking application 118. However, as previously discussed, publishing the social networking post 112 on the social networking system 102 including the shareable location 114 can be detrimental to the privacy, safety, and/or security of the user of user device 104.

In order to address the above challenge, aspects of the present disclosure are configured to incrementally modify a location resolution of the shareable location 114 using a location precision model 120 in the social networking system 102. The location precision model 120 can be configured dynamically modify the shareable location 114 according to one or more spatial and/or temporal parameters in order to increase privacy, safety, and/or security of the user of user device 104. For example, the location precision model 120 can be associated with threshold parameters 122 and location resolution parameters 124. Threshold parameters 122 can function together with location resolution parameters 124 in order to modify an accuracy of the shareable location 114 as a function of spatial, temporal, or spatial-temporal attributes of the current location 108 and/or current time 110 of the user device relative to the shareable location 114 and/or the publish time 116 of the social networking post 112. Threshold parameters 122 are discussed in more detail hereinafter with respect to FIGS. 3A-3C. Location resolution parameters 124 are discussed in more detail hereinafter with respect to FIGS. 4A-4C.

After inputting the social networking post 112 to the location precision model 120, the location precision model 120 can output a series of publishable items 126-1 through 126-N (collectively referred to as publishable items 126), where N can represent any integer value and reflect a series of publishable items of at least two. Each of the publishable items 126 can be associated with a location resolution (e.g., modified location 128-1 and updated modified location 128-N) and parameters for publishing each of the respective publishable items 126 (e.g., first publish parameters 130-1 and second publish parameters 130-N). Publish parameters 130 can be interrelated instances of threshold parameters 122 and location resolution parameters 124. In other words, publish parameters can define a respective location resolution for a respective temporal, spatial, or temporal-spatial threshold.

In order to better illustrate the interrelationships between the location precision model 120 and the publishable items 126, consider the following example: a user captures an image (e.g., social networking post 112) on a smartphone (e.g., user device 104). The image (e.g., social networking post 112) is associated with geocoordinates corresponding to an address of 123 XY Avenue, Town A, State B (e.g., shareable location 114) and a time of 11:10 AM (e.g., publish time 116). The user uploads (e.g., using social networking application 118) the photograph (e.g., social networking post 112) to a social network (e.g., a location precision model 120 of the social networking system 102). The social network publishes a first version of the post (e.g., publishable item 126-1) including a generalized location of "Town A, State B" (e.g., modified location 128-1) in response to satisfying a set of parameters (e.g., first publish parameters 130-1) such as a location of the user (e.g., current location 108) is different from the geocoordinates (e.g., shareable location 114) above one mile (e.g., a distance threshold 300, as discussed hereinafter with respect to FIGS. 3A-3C) for at least five minutes (e.g., a duration threshold 302 as discussed hereinafter with respect to FIGS. 3A-3C) and that the photograph is at least five minutes old (e.g., a time threshold 304 as discussed hereinafter with respect to FIGS. 3A-3C). Later, social networking system 102 publishes another version of the post (e.g., publishable item 126-N) including a more specific location of "XY Avenue, Town A, State B" (e.g., updated modified location 128-N) in response to satisfying another set of parameters (e.g., second publish parameters 130-N) such as a location of the user (e.g., current location 108) is different from the geocoordinates (e.g., shareable location 114) above 10 miles (e.g., distance threshold 300) for at least ten minutes (e.g., duration threshold 302) or that the photograph is at least 24 hours old (e.g., time threshold 304).

As can be seen from the above example, aspects of the present disclosure are configured to modify the specificity of location information associated with published content, such as photographs, videos, and/or posts published on social networking sites. Modifying the specificity of location information can lead to improved user privacy, security, and/or safety.

Furthermore, hosting the location precision model 120 on the social networking system 102 is advantageous insofar as it enables the social networking system 102 to provide dynamic location resolution modifications to all of its users as a feature of the social networking system 102, thereby concurrently improving privacy, safety, and/or security of hundreds, thousands, or millions of users.

Figure 2:
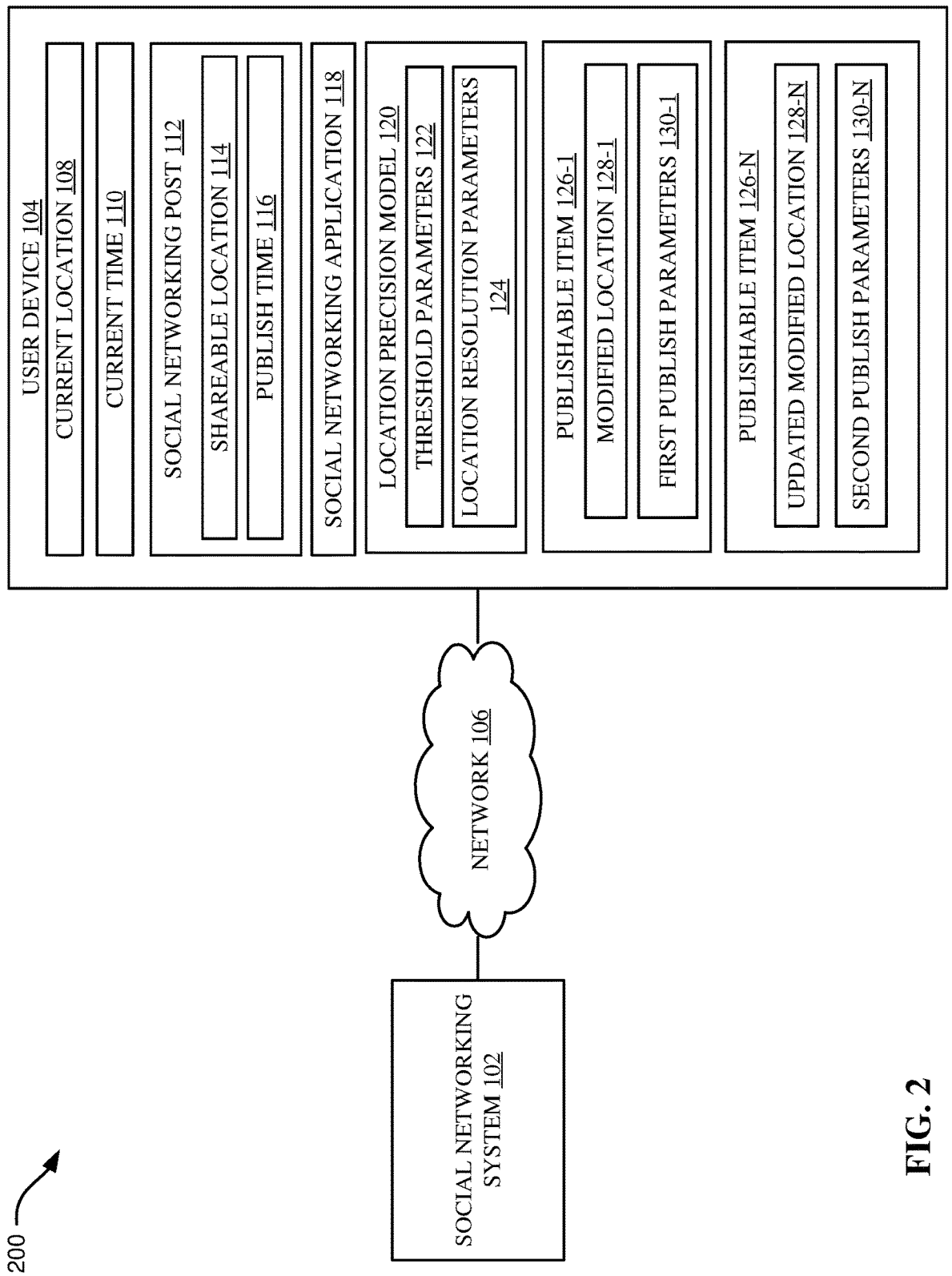
FIG. 2 illustrates a block diagram of another example social networking environment having a location precision model located on a user device, in accordance with some embodiments of the present disclosure.

FIG. 2 illustrates another example social networking environment 200. Social networking environment 200 includes similar components as discussed above with respect to social networking environment 100 of FIG. 1. For example, the social networking environment 200 includes a social networking system 102 communicatively coupled to a user device 104 via a network 106. Furthermore, the user device 104 includes the current location 108, current time 110, social networking post 112, shareable location 114, publish time 116, and social networking application 118.

However, in contrast to FIG. 1 where the location precision model 120 and publishable items 126 are located at the social networking system 102, in the social networking environment 200 of FIG. 2 the location precision model 120 and publishable items 126 are stored on user device 104. Storing the location precision model 120 and the publishable items 126 on the user device 104 can be advantageous for multiple reasons. For one, storing the location precision model 120 on the user device 104 can enable the location precision model 120 to be utilized for multiple social networking platforms. In other words, the location precision model 120 can function as a standalone application on user device 104 rather than a feature incorporated into a particular social networking platform (as shown in FIG. 1). As another example advantage, storing the location precision model 120 and the publishable items 126 on the user device 104 can increase security and privacy insofar as the user device 104 can "push" updated locations (e.g., modified location 128-1 and updated modified location 128-N) to the social networking system 102 when the appropriate parameters are met (e.g., publish parameters 130-1 and 130-N). In other words, the social networking system 102 does not have access to the shareable location 114. Thus, a hacked, infiltrated, or otherwise compromised social networking system 102 does not compromise the privacy, security, or safety of the user of user device 104.

Figure 3A:
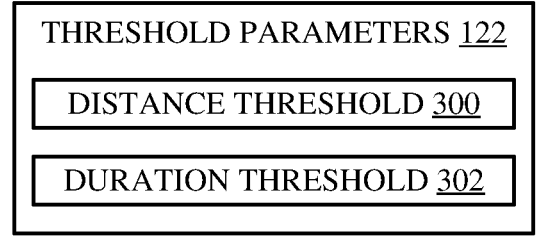
FIG. 3A illustrates a block diagram of example threshold parameters including a distance threshold and a duration threshold, in accordance with some embodiments of the present disclosure.
Figure 3B:
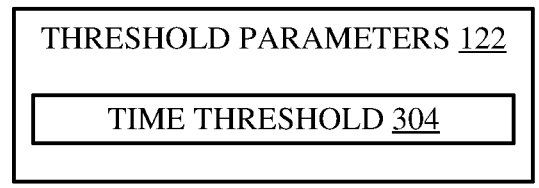
FIG. 3B illustrates a block diagram of example threshold parameters including a time threshold, in accordance with some embodiments of the present disclosure.
Figure 3C:
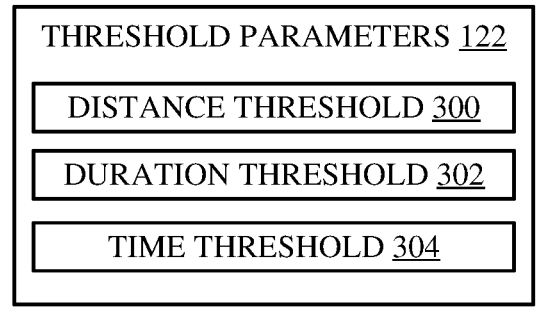
FIG. 3C illustrates a block diagram of example threshold parameters including a distance threshold, a duration threshold, and a time threshold, in accordance with some embodiments of the present disclosure.

Referring now to FIGS. 3A-3C, illustrated are various configurations of threshold parameters 122, in accordance with various embodiments of the present disclosure. FIG. 3A illustrates spatial threshold parameters 122 including a distance threshold 300 and, optionally, a duration threshold 302. The distance threshold 300 can be used by itself or in combination with the duration threshold 302, where the duration threshold 302 can be used to confirm or verify the adequacy of a distance satisfying the distance threshold 300. In embodiments utilizing the distance threshold 300 by itself, the distance between the current location 108 of the user device 104 and the shareable location 114 of the social networking post 112 must equal or exceed the distance threshold 300 in order to cause an updated modified location 128-N to be published to the social networking system 102.

In embodiments utilizing both the distance threshold 300 together with duration threshold 302, the distance between the current location 108 of the user device 104 and the shareable location 114 of the social networking post 112 must remain above the distance threshold 300 for a period of time equal to or exceeding the duration threshold 302 in order to cause an updated modified location 128-N to be published to the social networking system 102. Advantageously, the duration threshold 302 can be used to ensure the user is, in fact, leaving the shareable location 114. In other words, the duration threshold 302 can be used to filter out situations where the user temporarily exceeds the distance threshold 300 (e.g., by walking along a periphery of the distance threshold 300). Example distance thresholds 300 include, but are not limited to: 0.16 kilometers (km) (0.1 miles), 1.61 kilometers (1.0 miles), 8.05 kilometers (5 miles), 16.1 kilometers (10 miles), etc. Example duration thresholds 302 include, but are not limited to, five minutes, ten minutes, thirty minutes, one hour, etc.

FIG. 3B illustrates temporal threshold parameters 122 including a time threshold 304 such that once an amount of time between the current time 110 and the publish time 116 of the social networking post 112 is above the time threshold 304, a more precise version of the shareable location 114 (e.g., updated modified location 128-N) can be published by the social networking system 102. Example time thresholds 304 include, but are not limited to, ten minutes, thirty minutes, one hour, twelve hours, twenty-four hours, etc. The current time 110 can be collected from either the user device 104 or the social networking system 102, even though current time 110 is shown only in user device 104 for simplicity. Advantageously, using time threshold 304 does not necessarily require the social networking system 102 to remain in contact with the user device 104 for satisfying various threshold parameters 122 (e.g., the social networking system 102 does not need to collect current location 108 from the user device 104 as may be necessary when utilizing the distance threshold 300).

FIG. 3C illustrates spatial-temporal threshold parameters 122 including the distance threshold 300, the duration threshold 302, and the time threshold 304. In the embodiments illustrated in FIG. 3C, a more specific version of location information (e.g., updated modified location 128-N) can be published in response to some combination of spatial parameters and temporal parameters. For example, second publish parameters 130-N can require a time between the current time 110 of the user device 104 and the publish time 116 of the social networking post 112 to be above the time threshold 304 and/or a distance between the current location 108 of the user device 104 and the shareable location 114 of the social networking post 112 to be above the distance threshold 300 for a period of time equal to or exceeding the duration threshold 302. When the second publish parameters 130-N are satisfied, an updated modified location 128-N can be published to a social networking system 102.

As another example, the threshold parameters 122 discussed in FIG. 3C can utilize an algorithm. For example a score can be compared to a score threshold. In this example, the score can be based on a first value added to a second value, where the first value can equal a first weight parameter multiplied by a first ratio of the distance between the shareable location 114 and the current location 108 divided by the distance threshold 300, and where the second value can equal a second weight parameter multiplied by a second ratio of the time between the current time 110 and the publish time 116 divided by the time threshold 304. In this example, the duration threshold 302 may or may not be used as a factor in determining the first ratio. Further in this example, a score exceeding the score threshold can cause an updated modified location 128-N to be published to the social networking system 102.

Figure 4A:
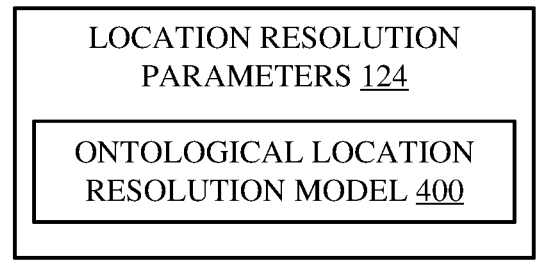
FIG. 4A illustrates a block diagram of example location resolution parameters including an ontological location resolution model, in accordance with some embodiments of the present disclosure.
Figure 4B:
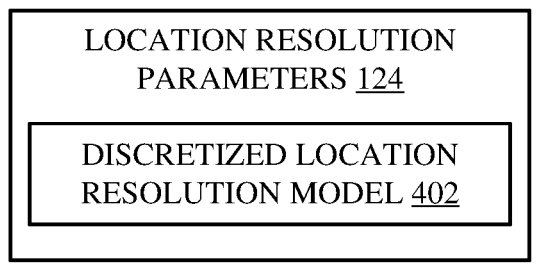
FIG. 4B illustrates a block diagram of example location resolution parameters including a discretized location resolution model, in accordance with some embodiments of the present disclosure.
Figure 4C:
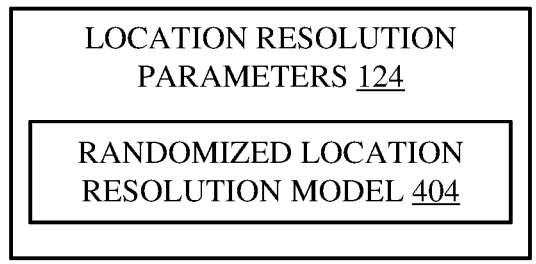
FIG. 4C illustrates a block diagram of example location resolution parameters including a randomized location resolution model, in accordance with some embodiments of the present disclosure.

FIGS. 4A-4C represent various location resolution parameters 124, in accordance with various embodiments of the present disclosure. FIG. 4A illustrates location resolution parameters 124 comprising an ontological location resolution model 400. The ontological location resolution model 400 can define variations in location specificity according to a hierarchical, language-based model. For example, in an order from most general to most specific, an example hierarchy of location resolutions from an ontological location resolution model 400 can comprise the classifications of: country, region, state, county, town, address. Advantageously, the ontological location resolution model 400 can be well-suited for Natural Language Processing (NLP) applications such as those modifying location resolutions created using text descriptors.

FIG. 4B illustrates location resolution parameters 124 comprising a discretized location resolution model 402. The discretized location resolution model 402 can define variations in location specificity according to a grid resolution (e.g., a grid tile size). For example, in an order from most general to most specific, an example discretized location resolution model 402 can comprise: 1,000 square mile grids, 500 square mile grids, 100 square mile grids, 50 square mile grids, 10 square mile grids, 1 square mile grids, 0.1 square mile grids, 0.01 square mile grids. Thus, the discretized location resolution model 402 can identify a location as a grid tile, where varying sizes of grid tiles correspond to varying location resolutions.

FIG. 4C illustrates location resolution parameters 124 comprising a randomized location resolution model 404. Randomized location resolution model 404 can define variations in location specificity according to randomly generated numbers. For example, for a shareable location 114 defined using geocoordinates such as 43°13'54.8"N 93°15'22.4"W, the randomized location resolution model 404 can generate variations in location specificity by generating random numbers in the portions of the geocoordinates marked by an "X" with increased location specific realized with fewer randomly generated numbers. For example, consider the following series of locations from least specific to most specific as output by the randomized location resolution model 404:
43°XX'XX.X"N 93°XX'XX.X"W; 43°1X'5X.X"N 93°1X'XX.X"W; 43°13'XX.X"N 93°15'XX.X"W; 43°13'5X.X"N 93°15'2X.X"W; 43°13'54.8"N 93°15'22.4"W.

As another example, for an example location described in Decimal Degrees (DD) format (e.g., 43.231878, −93.256232), the randomized location resolution model 404 can generate variations in location specificity by generating random numbers in the locations marked by an "X" as: 43.XXXXXX, −93.XXXXXX; 43.23XXXX, −93.25XXXX; 43.2318XX, −93.2562XX; 43.231878, −93.256232.

Figure 5A:
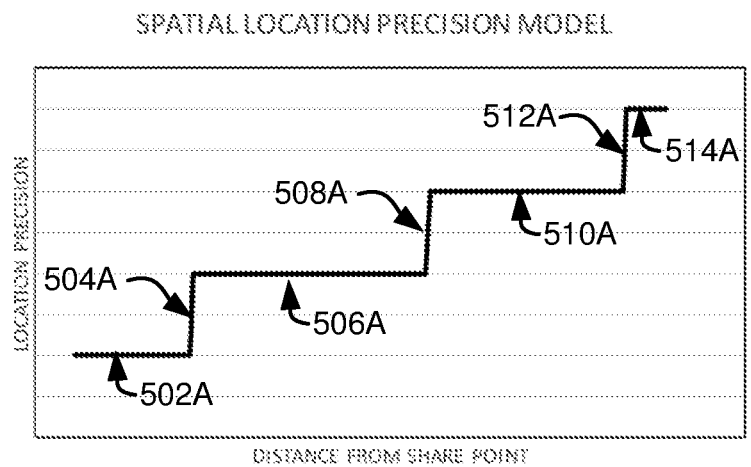
FIG. 5A illustrates a graph of a spatial location precision model, in accordance with some embodiments of the present disclosure.
Figure 5B:
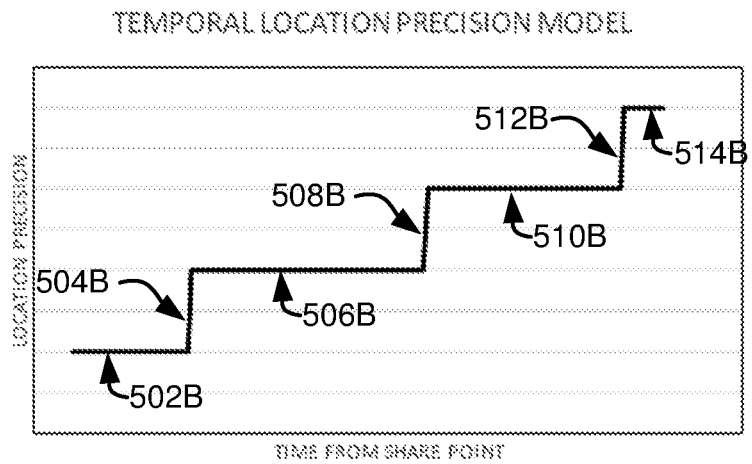
FIG. 5B illustrates a graph of a temporal location precision model, in accordance with some embodiments of the present disclosure.
Figure 5C:
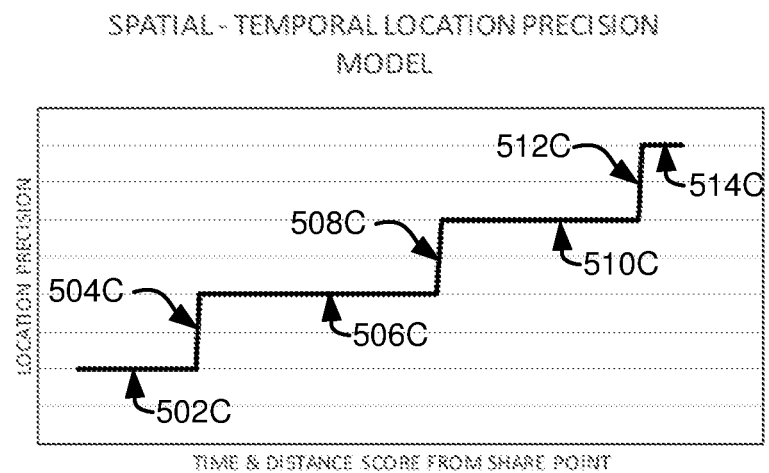
FIG. 5C illustrates a graph of a spatial-temporal location precision model, in accordance with some embodiments of the present disclosure.

FIGS. 5A-5C illustrate various graphical examples of a location precision model 120, in accordance with various embodiments of the present disclosure. Each of FIGS. 5A-5C illustrate a graph, where the y-axis can represent a varying degrees of location precision (according to location resolution parameters 124 such as the various embodiments discussed with respect to FIGS. 4A-4C), and where the x-axis can represent spatial and/or temporal characteristics (e.g., according to the threshold parameters 122 such as the various embodiments discussed with respect to FIGS. 3A-3C).

FIG. 5A illustrates an example graph 500A representing a spatially-based location precision model 120, in accordance with some embodiments of the present disclosure. As shown in FIG. 5A, the x-axis can represent a distance between the current location 108 and the shareable location 114 with closer distances represented closer to the origin (i.e., bottom left of graph 500A) and larger distances represented as a function of distance from the origin. The y-axis can represent a location precision with more generalized, ambiguous, or imprecise locations represented nearer the origin and more precise, specific, or exact locations represented further from the origin.

Thus, an initial publishable item 126-1 can be associated with a first location 502A (e.g., a state). At a first distance threshold 504A (e.g., one mile), the location precision model 120 can be configured to publish a second location 506A (e.g., city, state). At a second distance threshold 508A (e.g., five miles), the location precision model 120 can be configured to publish a third location 510A (e.g., street, city, state). At a third distance threshold 512A (e.g., ten miles), the location precision model 120 can be configured to publish a fourth location 514A (e.g., full address).

FIG. 5B illustrates an example graph 500B representing a temporally-based location precision model 120, in accordance with some embodiments of the present disclosure. As shown in FIG. 5B, the x-axis can represent a time between the current time 110 and the publish time 116 with shorter amounts of time represented nearer the origin and larger amounts of time between the current time 110 and the publish time 116 represented further from the origin. The y-axis can represent a location precision with more generalized, ambiguous, or imprecise locations represented nearer the origin and more precise, specific, or exact locations represented further from the origin.

Thus, an initial publishable item 126-1 can be associated with a first location 502B (e.g., a state). At a first time threshold 504B (e.g., thirty minutes), the location precision model 120 can be configured to publish a second location 506B (e.g., city, state). At a second time threshold 508B (e.g., two hours), the location precision model 120 can be configured to publish a third location 510B (e.g., street, city, state). At a third time threshold 512B (e.g., twenty-four hours), the location precision model 120 can be configured to publish a fourth location 514B (e.g., full address).

FIG. 5C illustrates an example graph 500C representing a spatial-temporal location precision model 120, in accordance with some embodiments of the present disclosure. As shown in FIG. 5C, the x-axis can represent a time and distance score from the shareable location 114 to the current location 108 and from the publish time 116 to the current time 110 with lower scores represented nearer the origin and larger scores represented further from the origin. The y-axis can represent a location precision with more generalized, ambiguous, or imprecise locations represented nearer the origin and more precise, specific, or exact locations represented further from the origin.

Thus, an initial publishable item 126-1 can be associated with a first location 502C (e.g., a state). At a first spatial-temporal threshold 504C (e.g., at least one mile between the shareable location 114 and the current location 108, and at least thirty minutes between the publish time 116 and the current time 110), the location precision model 120 can be configured to publish a second location 506C (e.g., city, state). At a second spatial-temporal threshold 508C (e.g., at least five miles between the shareable location 114 and the current location 108, and at least two hours between the publish time 116 and the current time 110), the location precision model 120 can be configured to publish a third location 510C (e.g., street, city, state). At a third spatial-temporal threshold 512C (e.g., at least ten miles between the shareable location 114 and the current location 108, and at least twenty-four hours between the publish time 116 and the current time 110), the location precision model 120 can be configured to publish a fourth location 514C (e.g., full address).

Although the aforementioned examples primarily discuss location precision in terms of a hierarchical ontology (e.g., as in the ontological location resolution model 400), this should not be construed as limiting, and other methods and techniques for conveying varying degrees of location precision (e.g., the discretized location resolution model 402, the randomized location resolution model 404, etc.) can be substituted into the aforementioned examples.

Furthermore, although FIGS. 5A-5C illustrate stepwise changes in location resolution as a result of binary threshold parameters, other alternatives also exist. For example, instead of thresholds, algorithms may be used to generate a continuously variable location resolution as a function of spatial and/or temporal characteristics.

Figure 6:
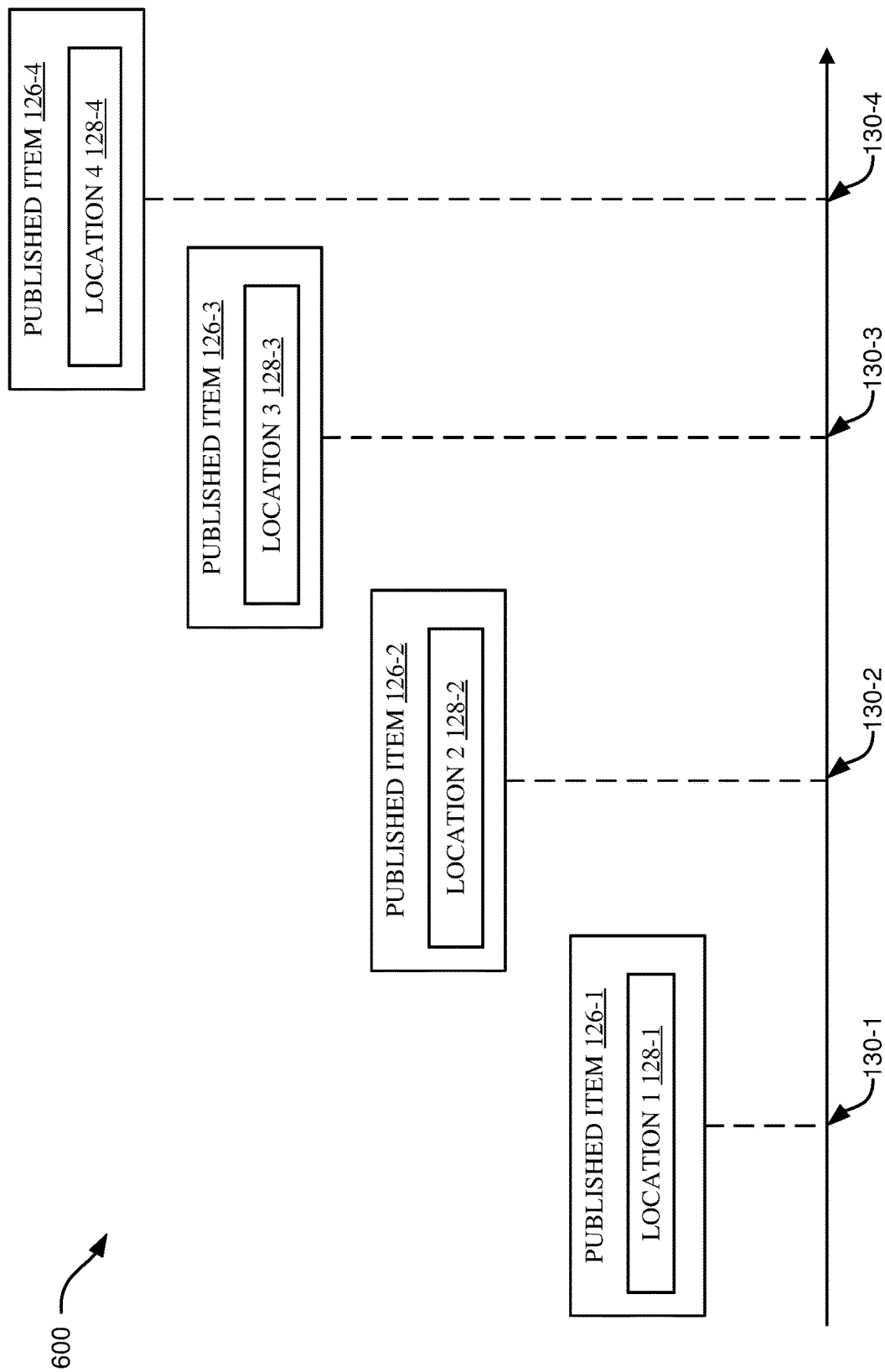
FIG. 6 illustrates a diagram of a publication sequence using a location precision model, in accordance with some embodiments of the present disclosure.

FIG. 6 illustrates an example publication sequence 600 for a social networking post 112 associated with a shareable location 114, in accordance with some embodiments of the present disclosure. Respective published items 126 in the publication sequence 600 can be generated by a social networking system 102 (e.g., as in FIG. 1) or by a user device 104 (e.g., as in FIG. 2). When the publication sequence 600 is generated by the social networking system 102, the social networking system 102 can also publish respective published items 126 of the publication sequence 600 when appropriate publish parameters 130 are satisfied. In contrast, when the publication sequence 600 is generated by the user device 104, the user device 104 can transmit respective published items 126 to the social networking system 102 for publication when corresponding publish parameters 130 are satisfied.

The publication sequence 600 includes a first published item 126-1 with a modified location 1 128-1 that is published according to a first set of publication parameters 130-1. The publication sequence 600 further includes a second published item 126-2 similar to the first published item 1 126-1 except for an updated modified location 2 128-2 which can be a more specific location compared to the modified location 1 128-1 and a less specific location compared to the shareable location 114. The second published item 126-2 is published when a second set of publication parameters 130-2 are satisfied.

The publication sequence 600 further includes a third published item 126-3 that is similar to the first published item 126-1 and the second publication item 126-2 except for an updated modified location 3 128-3 which can be a more specific location compared to the updated modified location 2 128-2 and less specific than the shareable location 114. The third published item 126-3 is published when a third set of publication parameters 130-3 are satisfied.

The publication sequence 600 further includes a fourth published item 126-4 that is similar to the first published item 126-1, the second published item 126-2, and the third published item 126-3 except for an updated modified location 4 128-4 which can be consistent with (e.g., equal to) the shareable location 114. The fourth published item 126-4 can be published in response to a fourth set of publication parameters 130-4 being satisfied.

As shown in FIG. 6, the location precision can increase as a function of time and/or distance parameters according to the publication parameters 130-1 through 130-4. For example, modified location 1 128-1 may indicate no location information or an unknown location, updated modified location 2 128-2 may indicate a state, updated modified location 3 128-3 may indicate a city and a state, and updated modified location 4 128-4 may indicate specific geocoordinates associated with the shareable location 114. Although four versions of the published item 126 are shown in FIG. 6, this is simply an example and more or fewer versions of the published item 126 can be published in various embodiments of the present disclosure.

Although FIG. 6 discusses modifications to location information, aspects of the present disclosure can also modify other aspects of the published items 128 in order to facilitate granular levels of location specificity. As one example, aspects of the present disclosure can be configured to brighten, darken, distort, blur, or otherwise modify a background of a photograph (or portions of a photograph such as street signs or building architectures) in order to decrease the visibility of identifiable markers in the background that may indicate the shareable location 114.

Figure 7:
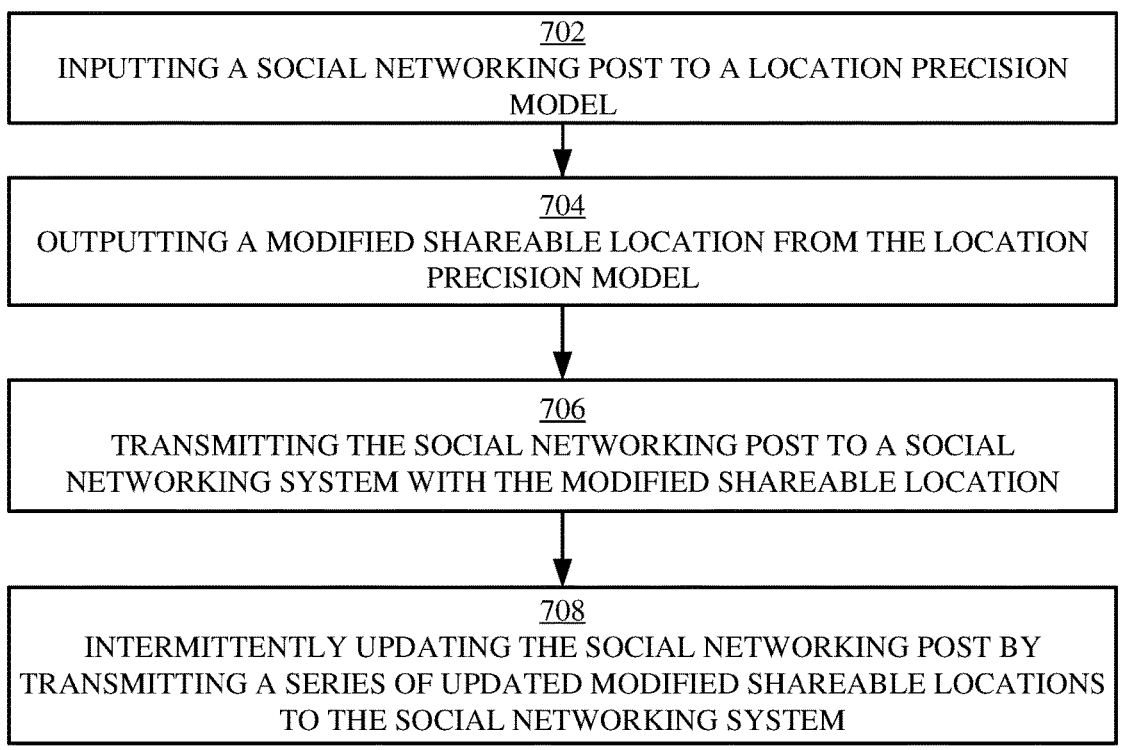
FIG. 7 illustrates a flowchart of an example method for dynamically modifying shared location information, in accordance with some embodiments of the present disclosure.

FIG. 7 illustrates a flowchart of an example method 700 for utilizing a location precision model 120 for increasing privacy, safety, and/or security of users of a social networking system 102, in accordance with some embodiments of the present disclosure. The method 700 can be implemented by a social networking system 102, a user device 104, a computer, a processor, or a different configuration hardware and/or software. In some embodiments, the method 700 is performed by a social networking system 102 in the social networking environment 100 of FIG. 1 or by the user device 104 in the social networking environment 200 of FIG. 2.

Operation 702 includes inputting a social networking post 112 to a location precision model 120. In some embodiments, the location precision model 120 is stored on one or more computer-readable storage media. In some embodiments, the social networking post 112 is associated with a publish time 116 and a shareable location 114. In some embodiments, instead of a social networking post 112, a geotagged post is input to the location precision model 120, and the geotagged post is associated with a geolocation.

Operation 704 includes outputting, from the location precision model 120, a modified shareable location (e.g., modified location 128-1). Although not explicitly shown, operation 704 can include comparing an amount of time between a publish time 116 and a current time 110 and/or a distance between the shareable location 114 and the current location 108 to one or more threshold parameters 122 (e.g., distance threshold 300, duration threshold 302, and/or time threshold 304). Based on the indicators from the threshold parameters 122, the location precision model 120 can determine an appropriate location resolution according to the location resolution parameters 124 (e.g., ontological location resolution model 400, discretized location resolution model 402, and/or randomized location resolution model 404).

Operation 706 includes transmitting the social networking post 112 (or the geotagged post) to a social networking system 102 with the modified shareable location 128-1. Operation 706 can include transmitting the post across a network (e.g., network 106) or within a system (e.g., between respective components of the social networking system 102 or the user device 104).

Operation 708 includes intermittently updating the social networking post 112 by transmitting a series of updated modified shareable locations (e.g., updated modified location 128-2) to the social networking system 102. For example, operation 708 can include creating a publication sequence 600 with varying degrees of location precision (e.g., as determined according to the location resolution parameters 124) as a result of various publish parameters 130 being satisfied (e.g., as determined according to threshold parameters 122).

Figure 8:
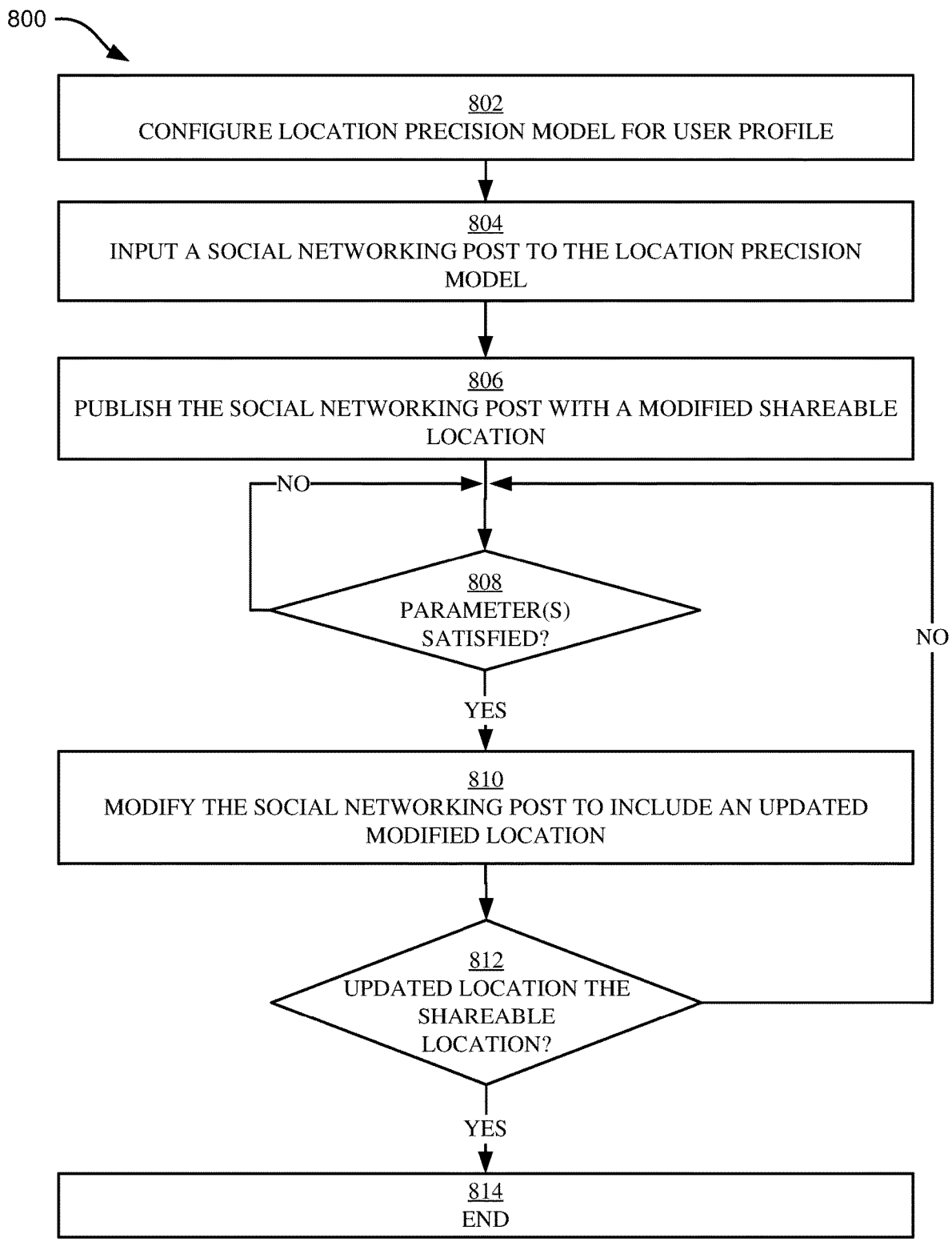
FIG. 8 illustrates a flowchart of another example method for dynamically modifying shared location information, in accordance with some embodiments of the present disclosure.

FIG. 8 illustrates a flowchart of another example method 800 for utilizing a location precision model 120 in order to increase privacy, safety, and/or security of a user of a user device 104, in accordance with some embodiments of the present disclosure. The method 800 can be implemented by a user device 104, a social networking system 102, a computer, a processor, or a different configuration hardware and/or software. In some embodiments, the method 800 is implemented by the social networking system 102 of the social networking environment 100 of FIG. 1, while in other embodiments the method 800 is implemented by a user device 104 of the social networking environment 200 of FIG. 2.

Operation 802 includes configuring a location precision model 120 for a user profile. In some embodiments, configuring the location precision model 120 includes interrelating one or more threshold parameters 122 and one or more location resolution parameters 124. In other words, each defined threshold (from threshold parameters 122) can be associated with a corresponding location resolution (from location resolution parameters 124). The thresholds and location resolutions can be automatically defined (e.g., using machine learning, deep learning, or another automated mechanism) or manually defined (e.g., based on user input or administrator input to the location precision model 120).

Operation 804 includes inputting a social networking post 112 from a user device 104 to a location precision model 120. In some embodiments, operation 804 includes receiving, at the social networking system 102 or at the user device 104, the social networking post 112. The social networking post 112 can include a shareable location 114 and a publish time 116. In some embodiments, operation 804 includes generating, by the location precision model 120 and based on the shareable location 114, the current location 108, the publish time 116, the current time 110, the threshold parameters 122, and/or the location resolution parameters 124, a modified location 128-1. In some embodiments, the modified location 128-1 is less specific than the shareable location 114. In some embodiments, the modified location 128-1 is a null location value, an unknown location, a generalized location (e.g., nation or state), or another ambiguous, general, random, or unspecific location information.

Operation 806 includes publishing (by the social networking system 102) or transmitting to the social networking system 102 for publication (by the user device 104), the social networking post 112 with the modified location 128-1.

Operation 808 includes determining if any publish parameters 130 are satisfied, where the publish parameters 130 can be made up on of one or more of the threshold parameters 122 and be associated with a corresponding location resolution from the location resolution parameters 124.

If none of the publish parameters 130 are satisfied (808: NO), then the method 800 returns to operation 808 and continues continuously, semi-continuously, or intermittently determining if any of the publish parameters 130 are satisfied. If one of the publish parameters 130 are satisfied (808: YES), then the method 800 proceeds to operation 810.

Operation 810 includes modifying the social networking post 112 to include an updated modified location 128-N. In some embodiments, operation 810 includes publishing (by the social networking system 102) or transmitting to the social networking system 102 for publication (by the user device 104) the social networking post 112 with the updated modified location 128-2. In some embodiments, the updated modified location 128-N is more specific than the modified location 128-1 but less specific than the shareable location 114.

Operation 812 includes determining if the updated modified location 128-2 is the shareable location 114. If not (812: NO), then the method 800 continuously, semi-continuously, or intermittently returns to operation 808 and determines if another of the publish parameters 130 are satisfied. If the updated modified location 128-2 is the shareable location 114 (812: YES), then the method proceeds to operation 814 and ends.

Figure 9A:
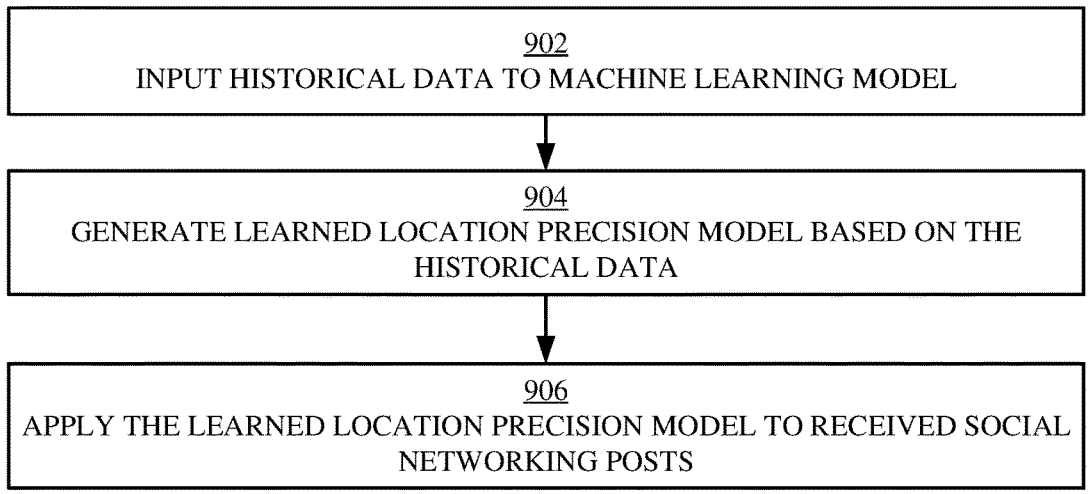
FIG. 9A illustrates a flowchart of an example method for generating a learned location precision model, in accordance with some embodiments of the present disclosure.

FIG. 9A illustrates a flowchart of an example method 900 for configuring a location precision model 120, in accordance with some embodiments of the present disclosure. The method 900 can be implemented by a social networking system 102, a user device 104, a computer, a processor, or another configuration of hardware and/or software. In some embodiments, the method 900 is a sub-method of operation 802 of FIG. 8.

Operation 902 includes inputting historical data to a machine learning model. The historical data can include, for example, social networking posts 112 with shareable locations 114 and publish times 116 together with data from user devices 104 such as current locations 108 and/or current times 110. In some embodiments, the historical data is from a single user, whereas in other embodiments, the historical data is from numerous users. Collectively, this information can be used to approximate, predict, or otherwise model user behavior around the time of posting items to a social networking system 102.

Operation 904 includes generating a learned location precision model 120 based on the historical data accumulated in operation 902. In some embodiments, operation 904 includes executing any number of machine learning algorithms such as, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, operation 904 can be configured to perform machine learning on the historical data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multi-dimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Operation 906 includes applying the learned location precision model 120 to received or detected social networking posts 112, such as is discussed in more detail with respect to FIGS. 7-8.

Figure 9B:
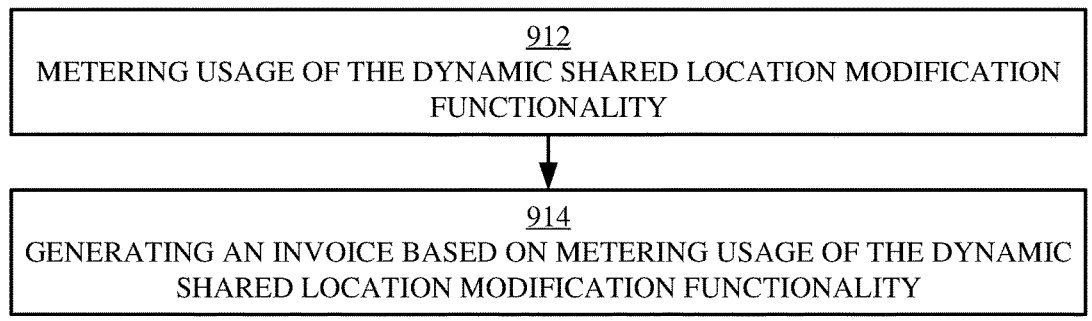
FIG. 9B illustrates a flowchart of an example method for metering and invoicing usage of dynamic shared location modification functionality, in accordance with some embodiments of the present disclosure.

FIG. 9B illustrates a flowchart of an example method 910 for metering usage of a location precision model 120, in accordance with some embodiments of the present disclosure. The method 900 can be implemented by a social networking system 102, a user device 104, a computer, a processor, or another configuration of hardware and/or software. In some embodiments, the method 910 is performed as a part of any of the methods illustrated in FIGS. 7-9A. In some embodiments, the method 910 is implemented in response to downloading software with dynamic shared location modification functionality from a remote data processing system. For example, the dynamic shared location modification functionality can be downloaded as an application to the user device 104, where the application interacts with one or more social networking applications 118 to improve privacy, safety, and/or security of the user.

Operation 912 includes metering usage of the dynamic shared location modification functionality. Metered usage can include one or more of: an amount of time used on a single device (or single user profile), a cumulative amount of time used on a designated set of devices (or designated set of user profiles), a number of devices (or number of user profiles) to which the dynamic shared location modification functionality is provided, a number of social networking posts 112 input to the location precision model 120, a number of publishable items 126 output from the location precision model 120, and/or other metering metrics.

Operation 914 includes generating an invoice based on metering usage of the dynamic shared location modification functionality. The invoice can be generated according to predetermined static or variable billing rates for a predetermined amount of time. The invoice can include information such as, but not limited to, an amount of usage per device (or per user profile), a rate of usage per device (or per user profile), an identification of respective devices (or user profiles) utilizing the dynamic shared location modification functionality, a time interval associated with the invoice, a total cost, and the like.

Figure 10:
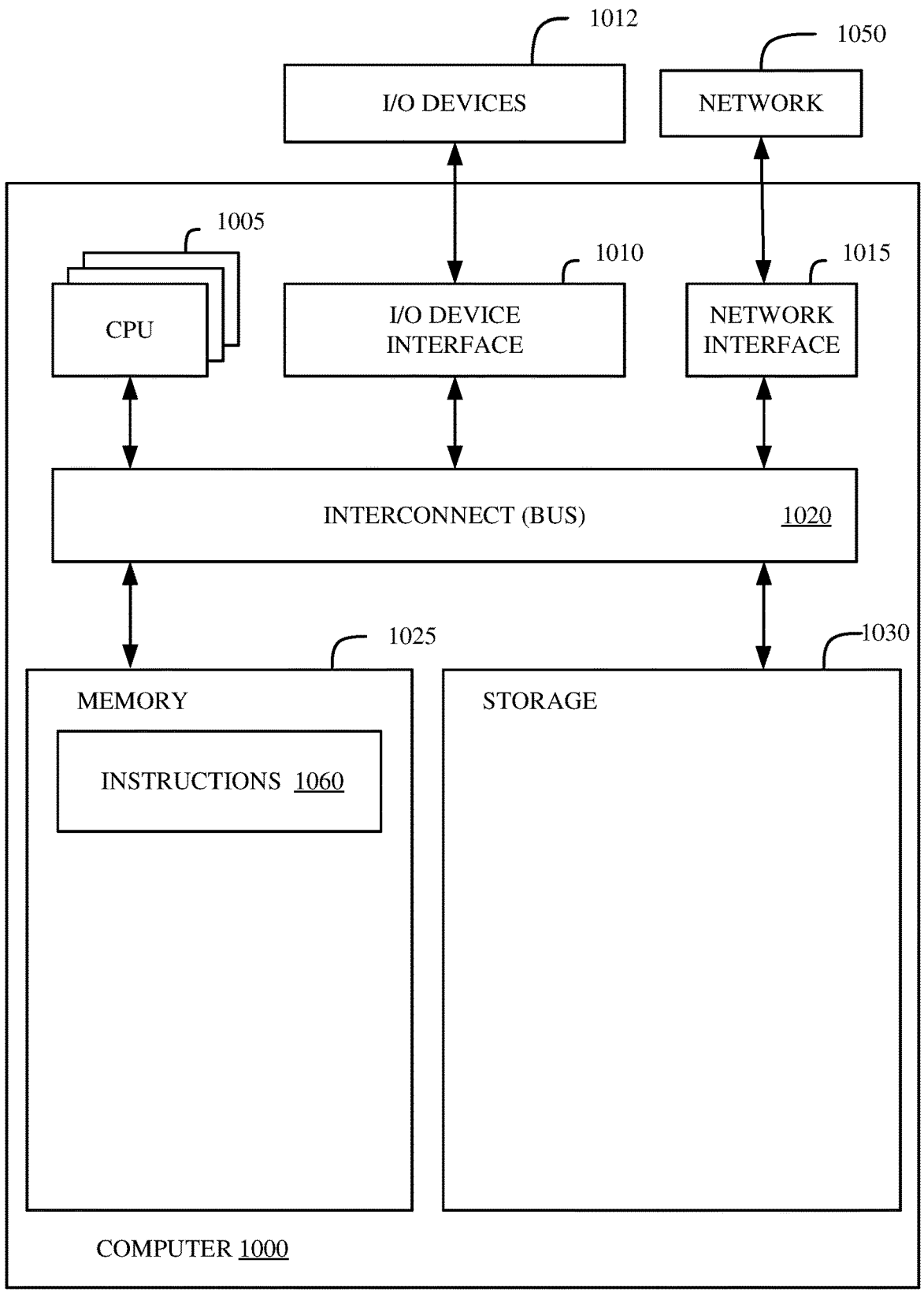
FIG. 10 illustrates a block diagram of an example computer, in accordance with some embodiments of the present disclosure.

FIG. 10 illustrates a block diagram of an example computer 1000 in accordance with some embodiments of the present disclosure. In various embodiments, computer 1000 can perform the methods described in any one or more of FIGS. 7-9 and/or implement the functionality discussed in any one of FIGS. 1-6. In some embodiments, computer 1000 receives instructions related to the aforementioned methods and functionalities by downloading processor-executable instructions from a remote data processing system via network 1050. In other embodiments, computer 1000 provides instructions for the aforementioned methods and/or functionalities to a client machine such that the client machine executes the method, or a portion of the method, based on the instructions provided by computer 1000. In some embodiments, the computer 1000 is incorporated into (or functionality similar to computer 1000 is virtually provisioned to) any one or more of the social networking system 102, the user device 104, or another aspect of the present disclosure.

Computer 1000 includes memory 1025, storage 1030, interconnect 1020 (e.g., BUS), one or more CPUs 1005 (also referred to as processors herein), I/O device interface 1010, I/O devices 1012, and network interface 1015.

Each CPU 1005 retrieves and executes programming instructions stored in memory 1025 or storage 1030. Interconnect 1020 is used to move data, such as programming instructions, between the CPUs 1005, I/O device interface 1010, storage 1030, network interface 1015, and memory 1025. Interconnect 1020 can be implemented using one or more busses. CPUs 1005 can be a single CPU, multiple CPUs, or a single CPU having multiple processing cores in various embodiments. In some embodiments, CPU 1005 can be a digital signal processor (DSP). In some embodiments, CPU 1005 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 1025 is generally included to be representative of a random-access memory (e.g., static random-access memory (SRAM), dynamic random access memory (DRAM), or Flash). Storage 1030 is generally included to be representative of a non-volatile memory, such as a hard disk drive, solid state device (SSD), removable memory cards, optical storage, or flash memory devices. In an alternative embodiment, storage 1030 can be replaced by storage area-network (SAN) devices, the cloud, or other devices connected to computer 1000 via I/O device interface 1010 or network 1050 via network interface 1015.

In some embodiments, memory 1025 stores instructions 1060. However, in various embodiments, instructions 1060 are stored partially in memory 1025 and partially in storage 1030, or they are stored entirely in memory 1025 or entirely in storage 1030, or they are accessed over network 1050 via network interface 1015.

Instructions 1060 can be computer-readable and computer-executable instructions for performing any portion of, or all of, any of the methods of FIGS. 7-9 and/or implementing any of the functionality discussed in FIGS. 1-6. In some embodiments, instructions 1060 can be software configured to provide dynamic shared location modification functionality when executed by hardware.

In various embodiments, I/O devices 1012 include an interface capable of presenting information and receiving input. For example, I/O devices 1012 can present information to a user interacting with computer 1000 and receive input from the user.

Computer 1000 is connected to network 1050 via network interface 1015. Network 1050 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
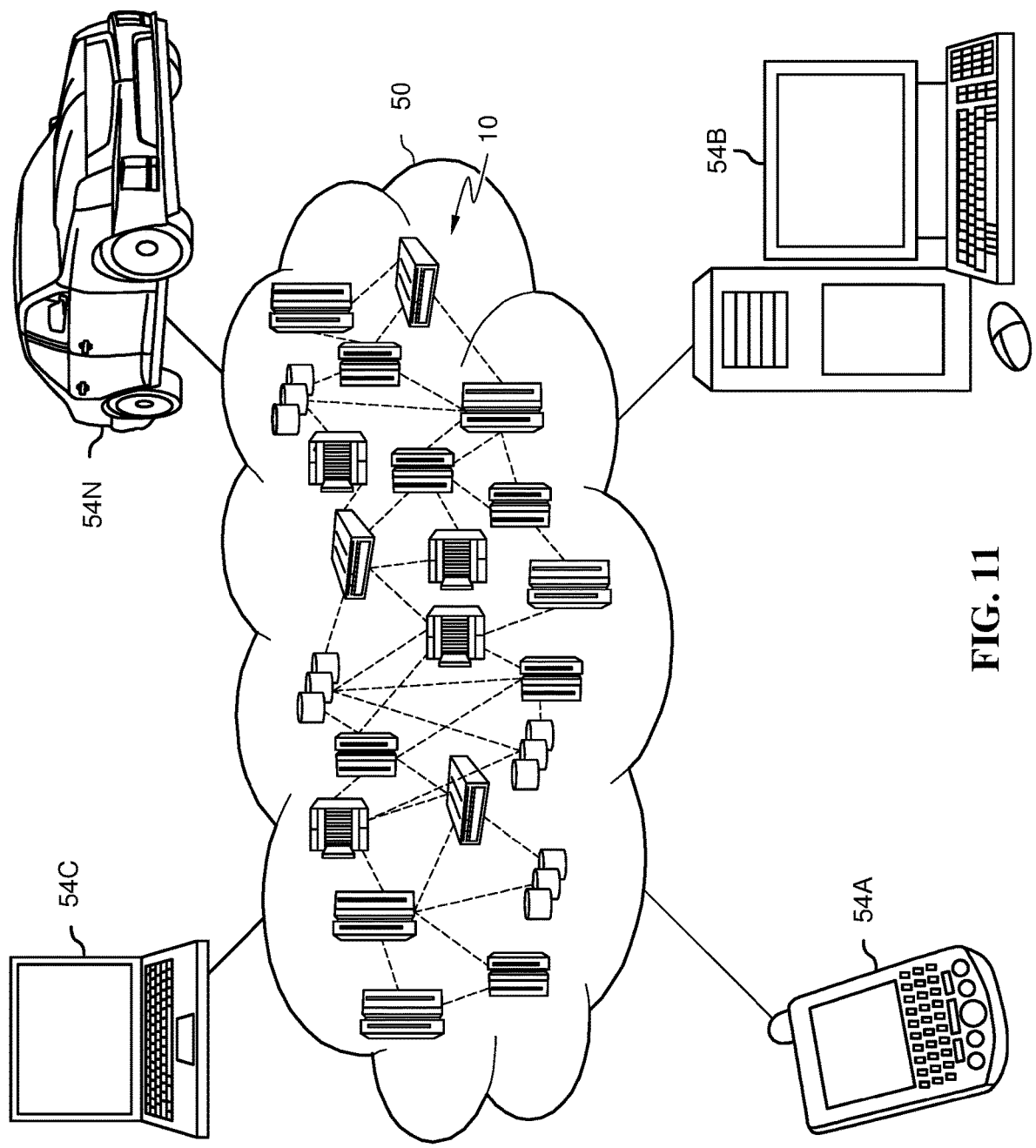
FIG. 11 depicts a cloud computing environment, in accordance with some embodiments of the present disclosure.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
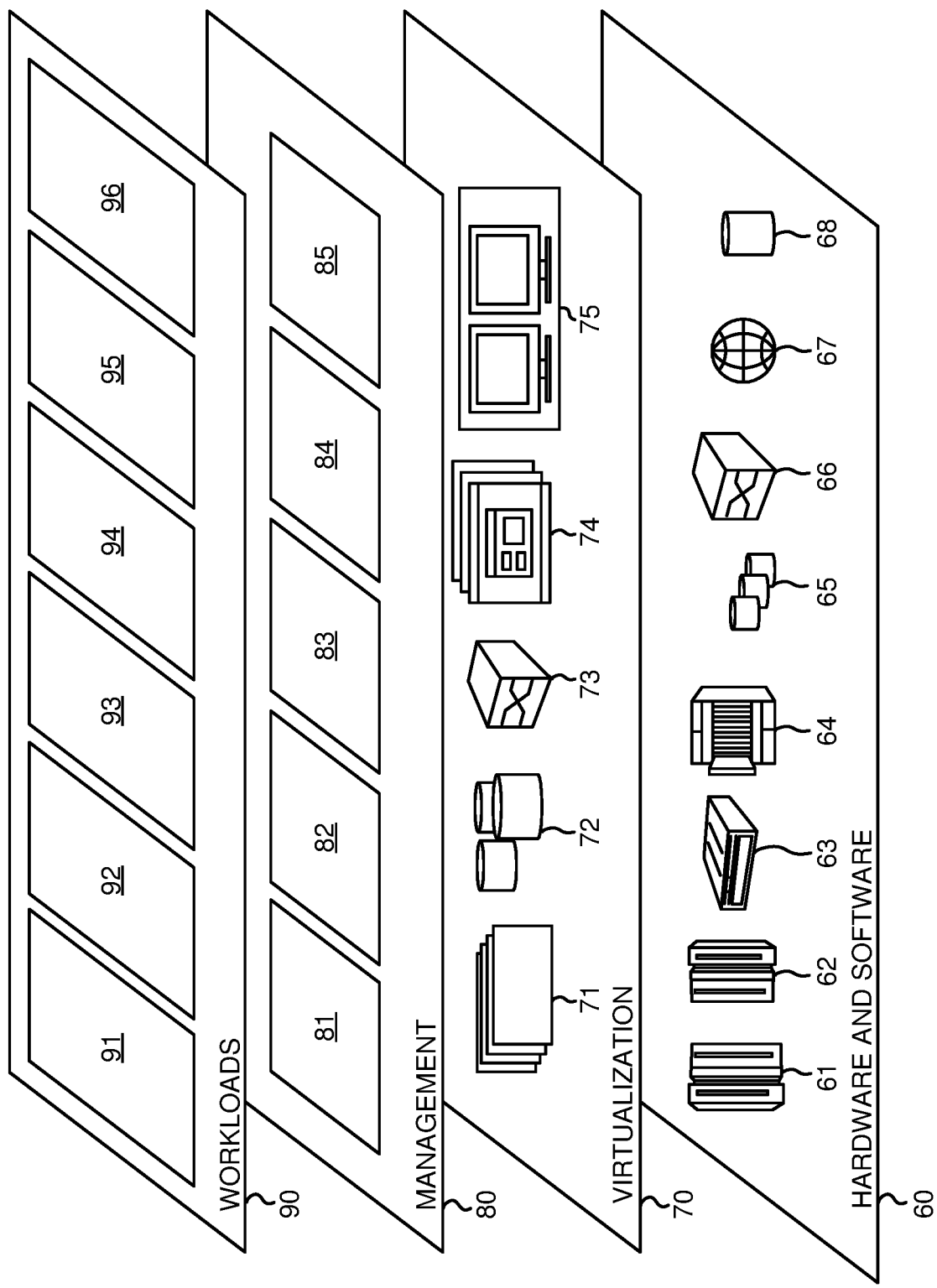
FIG. 12 depicts abstraction model layers, in accordance with some embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic shared location modification functionality 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 1060 of FIG. 10 and/or any software configured to perform any subset of the methods described with respect to FIGS. 7-9 and/or any of the functionality discussed in FIGS. 1-6) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

Some non-limiting example embodiments of the present disclosure will now be described:

First Embodiment: A computer-implemented method comprising inputting a social networking post to a location precision model configured to modify a location resolution of the social networking post, wherein the social networking post is associated with a first time and a shareable location; publishing the social networking post with a modified shareable location, wherein the modified shareable location is a generalized version of the shareable location; determining that a parameter associated with the location precision model is satisfied; and modifying the social networking post to include an updated modified shareable location, wherein the updated modified shareable location is more specific than the modified shareable location and less specific than the shareable location.

Second Embodiment: The limitations according to embodiment 1, wherein the location precision model is stored on a social networking system, and wherein the social networking post is received from a user device.

Third Embodiment: The limitations according to the embodiment 1, wherein the location precision model is stored on a user device, and wherein the social networking post is received from the user device.

Fourth Embodiment: The limitations according to any one of embodiments 1-3, wherein the updated modified shareable location is based on an amount of time between the first time and a current time.

Fifth Embodiment: The limitations according to any one of embodiments 1-4, wherein the modified shareable location is based on a distance between the shareable location and a current location of a user device that created the social networking post.

Sixth Embodiment: The limitations according to any one of embodiments 1-5, the method further comprising: determining that a second parameter associated with the location precision model is satisfied; and modifying the social networking post to include the shareable location.

Seventh Embodiment: The limitations according to any one of embodiments 1-3 or 6, wherein the parameter is an amount of time between the first time and a current time, and wherein the amount of time is greater than a time threshold.

Eighth Embodiment: The limitations according to any one of embodiments 1-3 or 6-7, wherein the parameter is a distance between the shareable location and a current location, and wherein the distance is greater than a distance threshold.

Ninth Embodiment: The limitations according to embodiment 8, wherein the distance is greater than the distance threshold for an amount of time at least equal to a duration threshold.

Tenth Embodiment: The limitations according to any one of embodiments 1-3, wherein the parameter is a score based on an amount of time between the first time and a current time and a distance between the shareable location and a current location, and wherein the score is greater than a score threshold.

Eleventh Embodiment: The limitations according to embodiment 10, wherein the score satisfies the score threshold in response to the distance between the shareable location and the current location being greater than a distance threshold for at least a duration threshold, and the time between the first time and the current time being greater than a time threshold.

Twelfth Embodiment: The limitations according to embodiment 10, wherein the amount of time between the first time and the current time is associated with a first weight parameter, and wherein the distance between the shareable location and the current location is associated with a second weight parameter.

Thirteenth Embodiment: The limitations according to any one of embodiments 1-10, wherein the location precision model is based on an ontological location resolution model, wherein the ontological location resolution model comprises an ontological hierarchy of location specificity.

Fourteenth Embodiment: The limitations according to any one of embodiments 1-10, wherein the location precision model is based on a discretized location resolution model, wherein the discretized location resolution model comprises varying map resolutions.

Fifteenth Embodiment: The limitations according to any one of embodiments 1-10, wherein the location precision model is based on a randomized location resolution model, wherein the randomized location resolution model is configured to randomize varying portions of the shareable location.

Sixteenth Embodiment: The limitations according to any one of embodiments 1-15, wherein the method is performed according to software that is downloaded to the social networking system from a remote data processing system.

Seventeenth Embodiment: The limitations according to embodiment 16, wherein the method further comprises: metering a usage of the software; and generating an invoice based on metering the usage.

Eighteenth Embodiment: The limitations according to any one of embodiments 1-17, wherein the method is executed by a system comprising one or more processors; and one or more computer readable storage media storing program instructions which, when executed by the one or more processors, are configured to cause the one or more processors to perform the method.

Nineteenth Embodiment: The limitations according to any one of embodiments 1-17, wherein the method is executed by a computer program product comprising one or more computer readable storage media, and program instructions collectively stored on the one or more computer readable storage media, the program instructions configured to cause one or more processors to collectively perform the method Twentieth Embodiment: A computer-implemented method comprising: inputting a social networking post received from a user device to a location precision model executing as an application on the user device, wherein the social networking post is associated with a first time and a shareable location; outputting, by the location precision model, a modified shareable location; and transmitting the social networking post to a social networking system with the modified shareable location, wherein the modified shareable location is a generalized version of the shareable location.

Twenty-first Embodiment: The limitations according to embodiment 20, further comprising transmitting, at a second time, the social networking post to the social networking system with an updated modified shareable location, wherein the updated modified shareable location is less specific than the shareable location and more specific than the modified shareable location.

Twenty-second Embodiment: The limitations according to any one of embodiments 20-21, wherein the modified shareable location is a function of an amount of time between the first time and a current time.

Twenty-third Embodiment: The limitations according to any one of embodiments 20-22, wherein the modified shareable location is a function of a distance between the shareable location and a current location of the user device.

Twenty-fourth Embodiment: A computer-implemented method comprising inputting a geotagged post received from a user device to a location precision model, wherein the geotagged post is associated with a first time and a geolocation; outputting, by the location precision model, a generalized geolocation; publishing the geotagged post with the generalized geolocation; and intermittently updating the geotagged post by publishing a series of updated generalized geolocations based on the location precision model and a location of the user device.

Twenty-fifth Embodiment: The limitations according to embodiment 24, wherein the location precision model is configured to modify location resolution of the geolocation as a function of an amount of time between a current time and the first time and a distance between the geolocation and the location of the user device.

What is claimed is:

1. A computer-implemented method comprising:
   inputting a social networking post to a location precision model configured to modify a location resolution of the social networking post, wherein the social networking post is associated with a first time that the social networking post was created and a shareable location;
   publishing the social networking post with a modified shareable location, wherein the modified shareable location is a generalized version of the shareable location;
   determining that a parameter associated with the location precision model is satisfied; and
   modifying the social networking post to include an updated modified shareable location, wherein the updated modified shareable location is more specific than the modified shareable location and less specific than the shareable location.

2. The method of claim 1, wherein the location precision model is stored on a social networking system, and wherein the social networking post is received from a user device.

3. The method of claim 1, wherein the location precision model is stored on a user device, and wherein the social networking post is received from the user device.

4. The method of claim 1, wherein the updated modified shareable location is based on an amount of time between the first time and a current time.

5. The method of claim 1, wherein the modified shareable location is based on a distance between the shareable location and a current location of a user device that created the social networking post.

6. The method according to claim 1, the method further comprising:
   determining that a second parameter associated with the location precision model is satisfied; and
   modifying the social networking post to include the shareable location.

7. The method of claim 1, wherein the parameter is an amount of time between the first time and a current time, and wherein the amount of time is greater than a time threshold.

8. The method of claim 1, wherein the parameter is a distance between the shareable location and a current location, and wherein the distance is greater than a distance threshold.

9. The method of claim 8, wherein the distance is greater than the distance threshold for an amount of time at least equal to a duration threshold.

10. The method of claim 1, wherein the parameter is a score based on an amount of time between the first time and a current time and a distance between the shareable location and a current location, and wherein the score is greater than a score threshold.

11. The method of claim 10, wherein the score satisfies the score threshold in response to the distance between the shareable location and the current location being greater than a distance threshold for at least a duration threshold, and the time between the first time and the current time being greater than a time threshold.

12. The method of claim 10, wherein the amount of time between the first time and the current time is associated with a first weight parameter, and wherein the distance between the shareable location and the current location is associated with a second weight parameter.

13. The method of claim 1, wherein the location precision model is based on an ontological location resolution model, wherein the ontological location resolution model comprises an ontological hierarchy of location specificity.

14. The method of claim 1, wherein the location precision model is based on a discretized location resolution model, wherein the discretized location resolution model comprises varying map resolutions.

15. The method of claim 1, wherein the location precision model is based on a randomized location resolution model, wherein the randomized location resolution model is configured to randomize varying portions of the shareable location.

16. The method of claim 1, wherein the method is performed according to software that is downloaded to a social networking system from a remote data processing system.

17. The method of claim 16, wherein the method further comprises:
   metering a usage of the software; and
   generating an invoice based on metering the usage.

18. A system comprising:
   one or more processors; and
   one or more computer readable storage media storing program instructions which, when executed by the one or more processors, are configured to cause the one or more processors to perform a method comprising:

inputting a social networking post to a location precision model configured to modify a location resolution of the social networking post, wherein the social networking post is associated with a first time that the social networking post was created and a shareable location;

publishing the social networking post with a modified shareable location, wherein the modified shareable location is a generalized version of the shareable location;

determining that a parameter associated with the location precision model is satisfied; and modifying the social networking post to include an updated modified shareable location, wherein the updated modified shareable location is more specific than the modified shareable location and less specific than the shareable location.

19. A non-transitory computer readable storage medium, the non-transitory computer readable storage medium storing program instructions configured to cause one or more processors to collectively perform a method comprising:

inputting a social networking post to a location precision model configured to modify a location resolution of the social networking post, wherein the social networking post is associated with a first time that the social networking post was created and a shareable location;

publishing the social networking post with a modified shareable location, wherein the modified shareable location is a generalized version of the shareable location;

determining that a parameter associated with the location precision model is satisfied; and modifying the social networking post to include an updated modified shareable location, wherein the updated modified shareable location is more specific than the modified shareable location and less specific than the shareable location.

20. A computer-implemented method comprising:

inputting a social networking post received from a user device to a location precision model executing as an application on the user device, wherein the social networking post is associated with a first time that the social networking post was created and a shareable location;

outputting, by the location precision model, a modified shareable location; and transmitting the social networking post to a social networking system with the modified shareable location, wherein the modified shareable location is a generalized version of the shareable location.

21. The method of claim 20, further comprising:

transmitting, at a second time after transmitting the social networking post to the social networking system, the social networking post to the social networking system with an updated modified shareable location, wherein the updated modified shareable location is less specific than the shareable location and more specific than the modified shareable location.

22. The method of claim 20, wherein the modified shareable location is a function of an amount of time between the first time and a current time.

23. The method of claim 20, wherein the modified shareable location is a function of a distance between the shareable location and a current location of the user device.

24. A computer-implemented method comprising:

inputting a geotagged post received from a user device to a location precision model, wherein the geotagged post is associated with a first time that the geotagged post was created and a geolocation;

outputting, by the location precision model, a generalized geolocation;

publishing the geotagged post with the generalized geolocation; and intermittently updating the geotagged post by publishing a series of updated generalized geolocations based on the location precision model and a location of the user device.

25. The method of claim 24, wherein the location precision model is configured to modify location resolution of the geolocation as a function of an amount of time between a current time and the first time and a distance between the geolocation and the location of the user device.

* * * * *